United States Patent [19]

Bolton et al.

[11] 4,419,249

[45] Dec. 6, 1983

[54] METHOD AND APPARATUS FOR DEWATERING A SLURRY OF FINE PARTICLES

[75] Inventors: Joseph A. Bolton, Queensbury; Louis L. Dufresne, Glen Falls, both of N.Y.

[73] Assignee: Albany International Corp., Menands, N.Y.

[21] Appl. No.: 328,085

[22] Filed: Dec. 7, 1981

[51] Int. Cl.³ ............................................. B01D 37/00
[52] U.S. Cl. ...................................... 210/783; 210/401
[58] Field of Search ............... 210/783, 400, 401, 769, 210/771

[56] References Cited

U.S. PATENT DOCUMENTS 2,730,933  1/1956  Reynolds ............................ 210/771
3,870,632  3/1975  Erskine ............................... 210/769

Primary Examiner—F. Sever

Attorney, Agent, or Firm—Kane, Dalsimer, Kane, Sullivan & Kurucz

[57] ABSTRACT

A method and apparatus for dewatering a slurry of fine particles including a dewatering table and a forming fabric passed across the table. Vacuum is applied to the table and the forming fabric. A first slurry of particles is introduced through a primary headbox to the forming fabric. A second slurry of finer particles is introduced through a secondary headbox to the forming fabric. The primary and secondary headboxes are positioned relative to each other and the table so that the first slurry is introduced to the forming fabric before the second slurry as the fabric moves across the table. Vacuum is applied to the first slurry to form a mat of first slurry particles upon which the second slurry of finer particles is deposited to be dewatered thereby minimizing the loss of fine particles through the forming fabric and maximizing the amount of retained dewatered particles.

18 Claims, 5 Drawing Figures

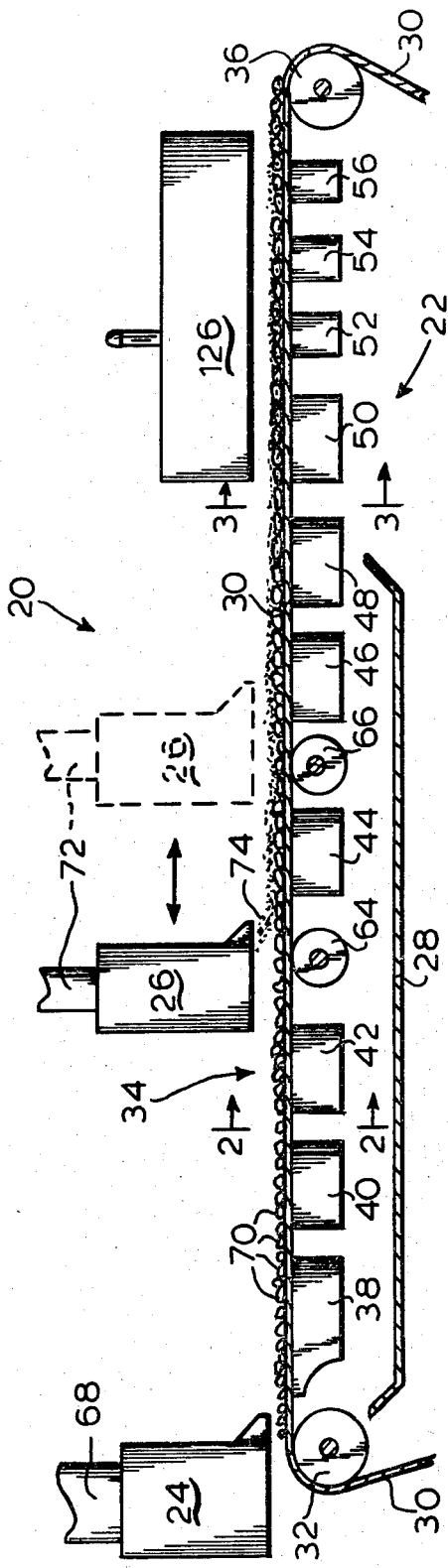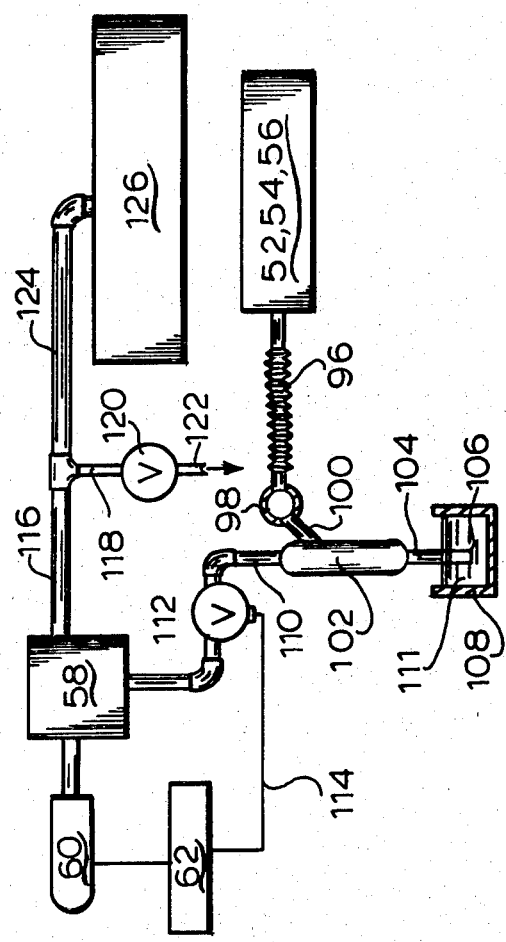

METHOD AND APPARATUS FOR DEWATERING A SLURRY OF FINE PARTICLES

BACKGROUND OF THE INVENTION

There are many environments where separation of liquid/particle mixtures is desirable. A difficulty that has often been encountered in the separation process concerns the loss of many of the finer particles. This occurs during the separation process where the fine particles are often too small to be captured by the separation medium and pass with the separated liquid. Reclamation of these particles is extremely difficult and often too impractical and costly.

An example of a pertinent environment is in connection with the processing of coal. Coal from the mines is ground and classified into several fractions. A common system would be to send a $1\frac{1}{2}$ inch$\times$0 fraction into the plant and make an initial separation into two fractions $1\frac{1}{2}\times\frac{1}{4}$ inch and $\frac{1}{4}\times 0$. The $\frac{1}{4}\times 0$ is then separated into $\frac{1}{4}\times 28$ mesh and $28\times 0$. The $28\times 0$ particles are called coal fines. As part of the cleaning and sizing of coal, a preparation plant must contend with these coal fines, that is coal particles finer than a 28 mesh screen.

In the past, these coal fines were separated by dissolved air floatation cells and dewatered on disc filters. The disc filters will dewater the fines to approximately 24% moisture. In a relatively large preparation plant, up to 150 tons per hour of fines are produced.

There is a desire in the industry to reduce the moisture content of the fine fraction. Drying is one alternative, however, it is expensive and a long term pollution source. An alternative is mechanical dewatering. It appears that a dryness of 15% moisture is the general target, with some preparation plants striving for $12\frac{1}{2}\%$ because of customer demands.

Dewatering of material has been accomplished in various industries in a variety of different ways, for example, mechanical devices such as vacuum augmented dewatering tables have been used in the paper-making industry for dewatering pulp and similar types of slurries. Other developed principles are also of interest. For example, in U.S. Pat. No. 3,138,088, the concept of using a mat of coarse particles as a base upon which finer particles can be collected is contemplated. It would certainly be advantageous if principles such as this could be adopted for use in a system to facilitate the dewatering of materials such as coal fines and to enhance the amount of reclaimed coal fines in such a process.

SUMMARY OF THE INVENTION

With the above background in mind, it is among the primary objectives of the present invention to provide an improved method and apparatus for dewatering coal fines or similar materials. It is contemplated that two headboxes can be used to feed coal or other particle slurries to a vacuum drainage table. For example, a coarser fraction of coal is provided in the first headbox to form a mat very quickly, since this coal dewaters very easily. Once a mat is formed, a second layer of very fine coal can be added through the secondary headbox to thereby greatly reduce the losses through the forming fabric. There is a significant increase in the overall retention of the coal fines by dewatering through a mat instead of the forming fabric.

It is an object of the present system to take advantage of a coal preparation plant's ability to fractionate a coal slurry into different fractions, for example, by the use of hydrocyclones, dissolved air floatation, chemical flocking agents, etc. By utilizing a multiple headbox drainage system, a drainage table is provided that has several advantages as a vacuum dewatering system. It provides a lower horsepower per ton vacuum requirement, better dryness, and overall retention.

The system is designed so that a vacuum table is provided with a forming fabric passing over the table in a manner which forms a horizontal surface. The table is connected to a conventional vacuum source to apply vacuum to the forming fabric passing thereover. The table includes an arrangement of vacuum boxes and dewatering blades to act upon the forming fabric and material contained thereon. A primary headbox is positioned at the beginning of the horizontal surface formed by the forming fabric in the direction of travel and the coarser particle fines, for example, coal fines, are distributed from the primary headbox onto the forming fabric. The vacuum dewatering table then quickly dewaters these coarse fines as they travel along the table to thereby form a mat on the forming fabric. A secondary headbox, which may be movable, is positioned intermediate the ends of the horizontal surface in position to discharge particle fines, for example coal fines, that are smaller than the particles forming the mat on the forming fabric. The finer particles are deposited onto the mat where they are dewatered with vacuum boxes. Depositing the smaller fines onto the mat results in a greater retention of the smaller fines and minimizes the loss of these fines through the forming fabric. The resultant mat of coarse and fine particles is then discharged from the table in a desired dewatered condition. A suitable further dewatering apparatus can then be employed to remove further water from the mat of particle fines. For example, a filter press can be used for this purpose. In this manner, an extremely desirable dewatered product of coal fines is achieved.

The system is also designed to incorporate other advantageous features. For example, the dewatering vacuum boxes can be interconnected with suitable water/air or air/water separators and with centrifugal exhausters so that the air and water mixture exiting from the vacuum table can be separated to provide for collection of the water and reuse in showers or recycled within the system. Hot discharge air from an exhauster can be connected to a suitable hood overlying the vacuum table to reduce the viscosity of the water thereby making it easier to dewater the coal fines.

It is an objective to provide a system which is useful in dewatering of coal fines and also other similar industries with common dewatering problems such as the dewatering of corn residuals from a gasahol process.

In summary, a method and apparatus is provided for dewatering a slurry of fine particles. A forming fabric is passed across a dewatering table and vacuum is applied to the table and the forming fabric passed thereover. A primary headbox is positioned for the introduction of a first slurry of particles to the forming fabric. A secondary headbox is positioned for depositing a secondary slurry of particles to the forming fabric with the particles in the second slurry being finer than the particles in the first slurry. The primary and secondary headboxes are positioned relative to each other and the table so that the first slurry is introduced to the forming fabric before the second slurry as the fabric moves across the table and vacuum is applied thereto to dewater the slurry so that a mat is formed of first slurry particles upon which the second slurry of fine particles is deposited to be dewatered. In this manner, the loss of fine particles through the forming fabric is minimized and the amount of retained dewatered particles is maximized.

With the above objectives among others in mind, reference is made to the attached drawings.

BREIF DESCRIPTION OF THE DRAWINGS

In the drawings:

FIG. 1 is a schematic view of the apparatus of the invention with arrows showing the direction of travel and an alternate position of the movable secondary headbox shown in phantom;

FIG. 5 is a schematic view of a further modification to the system whereby a collected air/water mixture can be separated.

DETAILED DESCRIPTION

Figure 2:
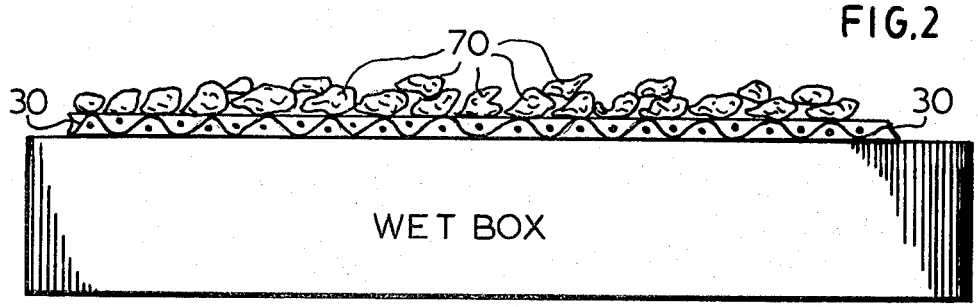
FIG. 2 is an enlarged fragmentary view of a portion of the apparatus at an initial point in the process.

Apparatus 20 is shown in FIG. 1 arranged for dewatering coal fines. The apparatus includes a dewatering table 22, a primary headbox 24, a secondary headbox 26, and a collection pan 28 for separated water. The vacuum drainage table 22 is a conventional type of drainage table common to the papermaking industry and in the embodiment shown, it is shown in use in the dewatering of coal fines. The working surface of dewatering table 22 is depicted in the schematic drawings and the remainder of the conventional structure is not shown. The forming fabric 30 of dewatering table 22 is an endless belt type of arrangement and enters the work area over a first guide roll 32 in a manner which directs the forming fabric into a horizontal direction to form a work surface 34 traveling in the direction shown by the arrow in FIG. 1, from left to right. The forming fabric extends a predetermined horizontal distance to form the work surface 34 and then exits the work area over a guide roll 36 from where it is directed down through the remainder of the dewatering table until it returns as an endless belt onto roll 32.

Beneath the work surface 34 formed by forming fabric 30 is a longitudinal arrangement of conventional dewatering equipment, for example that used in the papermaking industry. At the entry end is a bladed forming board 38 having, for example, four blades and extending 24 includes wide. Adjacent to forming board 38 is a plurality of side by side bladed wet boxes 40, 42, 44, 46, 48, and 50. These wet boxes contain a plurality of blades. Adjacent to the last wet box in a direction of travel are three side by side flat boxes 52, 54 and 56. The last flat box 56 is adjacent to the guide roll 36 at the end of the horizontal work surface 34. Vacuum is applied to the wet boxes and dry boxes to act in drawing air through the work surface portion of the forming fabric and therewith drawing water from the particles deposited on the work surface. In the depicted embodiment, the particles are coal fines. A conventional source of suction can be utilized for applying the vacuum such as a centrifugal exhauser 58 or alternataively a positive displacement vacuum pump, driven by a drive motor 60 and controlled by electrical controls 62. As previously stated, a collector pan 28 can be positioned beneath the wet end of the dewatering table for collecting the substantial portion of water initially removed from the particles on the work surface. Appropriate support rolls 64 and 66 are provided to support the central portion of the work surface area 34 and maintain it in substantially horizontal position.

The primary headbox 24 is positioned immediately above the entrance roll 32 at the initial point of work surface 34. The secondary headbox 26 is positioned intermediate the ends of the work surface 34 and is shiftable as shown by the arrow in FIG. 1 between a desired chosen arrangement of positions in the intermediate portion of the work surface. Both headboxes are also commonly available well known commercial products.

A suitable introducing conduit 68 is connected to the primary headbox 24 and to a source of a first slurry of coarse coal fines. This slurry of coarse coal fines 70 is introduced through the primary headbox at the initial end of the work surface 34 onto the forming fabric 30. These particles are initially dewatered very quickly under the influence of vacuum on the dewatering table and the bladed forming board 38 and wet boxes 40 and 42. This dewatered mat of coarse particles 70 is shown in detail in FIG. 2 as it rests on the forming fabric 30.

Figure 3:
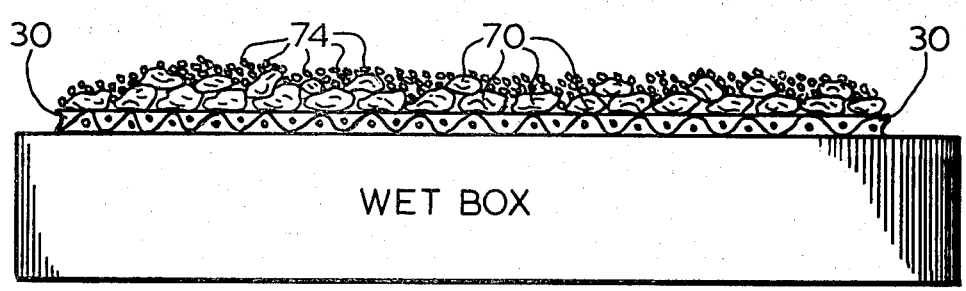
FIG. 3 is an enlarged fragmentary view showing a portion of the apparatus at a secondary point in the process.

The mat of particles on the forming fabric then travels beneath the secondary headbox 26. A suitable conduit 72 is connected to a source of a second slurry of coal fines 74 smaller in size than the coarse coal fines 70 and to the secondary headbox 26 so that a second slurry of fine particles 74 is deposited on the formed partially dewatered mat of coarse particles 70. The smaller particles 74 will rest on the mat of larger particles 70 as shown in detail in FIG. 3. This combination is dewatered through passage over the remaining wet boxes 44, 46, 48 and 50 and the flat boxes 52, 54 and 56 and by the vacuum applied thereto. As the water is removed from the mat of particles 70 and slurry of particles 74 a large number of the fine particles 74 will be retained on the larger particles 70 and will not pass through the forming fabric 30 and be lost. In this manner, a high percentage of fines are retained. The secondary headbox 26 is adjustable to facilitate deposition of the slurry of fine particles 74 onto the mat of coarser particles 70.

Figure 4:
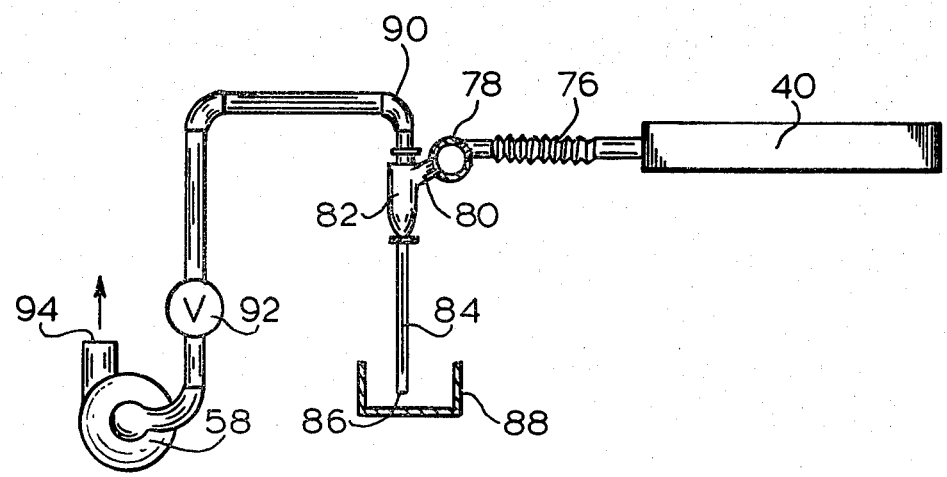
FIG. 4 is a schematic view of a modification to the system whereby a collected air/water mixture can be separated.

Two modifications of the system, as described, are depicted in FIGS. 4 and 5. The removed air/water mixture collected through the work surface portion of the forming fabric 30 generally is subjected to further treatment. It is often desirable to separate the water and air for further use or disposal of each element as desired. This can be accomplished in the present system in a number of ways and two advantageous systems for this purpose are shown in FIGS. 4 and 5.

In FIG. 4, each of the wet boxes 40, 42, 44, 46, 48, and 50 is connected by a suitable flexible connector 76 to a header 78 which has a sloped connector portion 80 directed to a conventional well known water/air separator 82, for example a 48 inch diameter air/water separator. A drop leg 84 extends downward from the separator 82 and its open bottom end 86 extends into a seal pit 88 for collection of the separated water. A conduit 90 extends from the top end of separator 82 to exhauster 58. A manual valve 92 is provided intermediate the ends of conduit 90 to provide a manual control for operation of this portion of the system. The exhauster 58 has an exhaust passageway 94 for discharge of the separated air. This is a quick and efficient means for separating the water and air mixture accumulated from the dewatering table 22.

In a similar manner, each of the flat boxes 52, 54, and 56 can be connected by a flexible conduit 96 to a header 98 having a sloped exit passageway 100 into a conventional separator 102. The separator 102 as shown in FIG. 5 is also a conventional well known 48 inch diameter air/water separator. Separator 102 has a drop leg 104 extending from its bottom end terminating in an opening 106 extending into a seal pit 108 for collection of the separated water 110. At the upper end of separator 102 a conduit 110 for the separated air is connected to exhauster 58 and has a valve 112 intermediate its ends for optional operation of this portion of the system. An electrical connector 114 connects valve 112 with the control panel 62. The exhauster 58 is provided with two optional passages for the separated air. It can be directed through conduit 116 to conduit 118 when valve 120 is open to discharge the separated air to atmosphere through opening 122. Alternatively, when valve 120 is closed, the air blowing through conduit 116 can continue through conduit 124 to hood 126. Hood 126 can be positioned over the work surface 34 portion which overlies, for example, wet box 50 and flat boxes 52, 54 and 56 to provide additional hot air to facilitate the dewatering and drying of the coal fines that have been deposited on that portion of the work surface 34.

The elements of the modification are all commercially available products. The centrifugal exhauster used in all of the described system arrangements are also well known commercially available products.

At the end of the work surface 34, the dewatered coal fines can be further treated by discharging the fines onto a further work station, for example, one containing a filter press for further dewatering if desired (not shown). In operation, using the apparatus of the drawings, coal fines can be dewatered in the following desirable manner. The primary headbox 24 and the secondary headbox 26 are used to feed different size coal slurries to the drainage table 22. In this manner, coal particles finer than a 28 mesh screen, commonly called 28×0 fines can be dewatered and retained. A coarser fraction of coal in the primary headbox is first deposited on the forming fabric 30. This coarse coal 70 dewaters very easily thus forming a mat very quickly. Once a mat is formed, a second layer of very fine coal 74 can be added through the secondary headbox 26, thus greatly reducing the losses through the forming fabric. In other words, the overall retention of the coal fines is significantly increased by dewatering through a mat instead of the forming fabric. The percentage retention of the coal fines increases as the mat travel from the wet end toward the dry end of the work surface 34. The present system takes advantage of a coal preparation plant's ability to fractionate coal slurried into different fractions. By utilizing a multiple headbox drainage system, a drainage table is provided that has several advantages including potentially lower horsepower per ton vacuum requirements, better dryness, and overall retention.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. An apparatus for dewatering a slurry of particles comprising: forming fabric; means for driving said forming fabric with said means being sized; primary headbox being sized for feeding a first slurry of particles at a predetermined rate onto the forming fabric; secondary headbox being sized for feeding a second slurry of particles at a predetermined rate onto the first slurry of particles deposited on the forming fabric; suction means being sized and positioned so as to provide a vacuum on forming fabric passing thereby; sand forming fabric being of sufficient porosity and said suction means providing sufficient vacuum so as to allow dewatering of the first and second slurry of particles on the forming fabric by the suction means; and said means for driving said forming fabric drives at a rate sufficient to provide a mat of essentially only two discrete layers on the forming fabric.

2. The invention in accordance with claim 1 wherein the particles being dewatered are coal particles.

3. The invention in accordance with claim 2 wherein the coal particles in the second slurry are finer than 28 mesh.

4. The invention in accordance with claim 1 which further includes a dewatering table supporting the forming fabric thereon and wherein the primary headbox is positioned at the end of the dewatering table first contacted by the forming fabric in the direction of travel across the table and the secondary headbox is located intermediate the ends of the dewatering table and is movable to facilitate deposition of the second slurry upon the mat of first slurry particles on the forming fabric.

5. The invention in accordance with claim 1 which further includes a dewatering table supporting the forming fabric thereon and wherein the dewatering table includes spaced guide rolls over which the forming fabric passes in order to form a horizontal receiving surface of forming fabric between the rolls for deposition of the slurries of particles thereon, collection means beneath the table for accumulation of the water removed from the slurry, a bladed forming board beneath the surface of forming fabric adjacent to the primary headbox and, a plurality of bladed wet boxes side by side beneath the horizontal surface formed by the forming fabric and the first wet box in the direction of travel of the forming fabric being adjacent to the bladed forming board, a plurality of flat boxes in side by side position beneath the horizontal surface formed by the forming fabric and with the first flat box in the direction of travel of the forming fabric being adjacent to the last of the bladed wet boxes, the last flat box in the direction of travel being adjacent to the end of the horizontal surface of forming fabric in the direction of travel.

6. The invention in accordance with claim 1 which further includes a dewatering table supporting the forming fabric thereon and wherein the dewatering table includes at least one flat box, an air/water separator connected to the at least one flat box, a centrifugal exhauster connected to the separator for applying vacuum to the dewatering table and the separator and discharging separated air, means for collecting the water accumulated in the separator, drive means for the exhauster, and control means for operating the drive means and exhauster.

7. The invention in accordance with claim 6 wherein the exhauster is connected to a hood overlying a portion of the forming fabric for allowing a predetermined portion of the dewatering table to supply separated air to the forming fabric thereon and facilitate the dewatering process.

8. The invention in accordance with claim 1 which further includes a dewatering table supporting the forming fabric thereon and wherein the dewatering table includes at least one wet box beneath the forming fabric through which to accumulate a mixture of air and water during dewatering of the particles, an air/water separator connected to the at least one wet box to separate the air and water mixture accumulated therein, a centrifugal exhauster connected to the separator to supply vacuum to the dewatering table and the separator and to collect and dispose of the air segregated in the separator, drive means for the separator, means for collecting water accumulated in the separator, and control means for operating the exhauster, the separator and the remainder of the dewatering table.

9. The invention in accordance with claim 1 which includes a dewatering table supporting the forming fabric thereon and having an end at which the particles are discharged; and a filter press positioned adjacent the discharge end of the dewatering table and the particles leaving the table are discharged into the filter press for further dewatering.

10. A method for dewatering a slurry of particles comprising: providing headbox, secondary headbox, suction means, forming fabric of preselected porosity, and means for driving the forming fabric; feeding a first slurry of particles at a first rate from the primary headbox onto the forming fabric; feeding a second slurry of particles at a second rate from a secondary headbox onto the first slurry of particles; creating a sufficient vacuum on the first and second slurry of particles through the forming fabric by the suction means to cause dewatering of the first and second slurries thereon; driving said forming fabric at a fourth rate of speed by the driving means; and said first, second, third and fourth rates of speed being sufficient so as to provide a mat of essentially only two discrete layers.

11. The invention in accordance with claim 10 which includes the steps of providing coal particles to be dewatered.

12. The invention in accordance with claim 11 wherein the coal particles in the second slurry are finer than 28 mesh.

13. The invention in accordance with claim 10 which includes the steps of providing a dewatering table supporting the forming fabric thereon and a secondary headbox which is movable to facilitate deposition of the second slurry upon the mat of first slurry particles on the forming fabric; positioning the primary headbox at the end of the dewatering table first contacted by the forming fabric in the direction of travel across the table; and positioning the secondary headbox intermediate the ends of the dewatering table.

14. The invention in accordance with claim 10 which includes the steps of providing a dewatering table for supporting the forming fabric thereon which includes spaced guide rolls over which the forming fabric passes in order to form a horizontal receiving surface of forming fabric between the rolls for deposition of the slurries of particles thereon, collection means beneath the table for accumulation of the water removed from the slurry, a bladed forming board beneath the surface of forming fabric adjacent to the primary headbox and, a plurality of bladed wet boxes side by side beneath the horizontal surface formed by the forming fabric and the first wet box in the direction of travel of the forming fabric being adjacent to the bladed forming board, a plurality of flat boxes in side by side position beneath the horizontal surface formed by the forming fabric and with the first flat box in the direction of travel of the forming fabric being adjacent to the last of the bladed wet boxes, the last flat box in the direction of travel being adjacent to the end of the horizontal surface of forming fabric in the direction of travel.

15. The invention in accordance with claim 10 which includes the steps of providing a dewatering table for supporting the forming fabric thereon which includes at least one flat box, an air/water separator connected to at least one flat box, a centrifugal exhauster connected to the separator for applying vacuum to the dewatering table and the separator and discharging separated air, means for collecting the water accumulated in the separator, drive means for the exhauster, and control means for operating the drive means and exhauster.

16. The invention in accordance with claim 15 which includes the steps of connecting the exhauster to a hood overlying a portion of the forming fabric for allowing a predetermined portion of the dewatering table to supply separated air to the forming fabric thereon and thereby facilitate the dewatering process.

17. The invention in accordance with claim 10 which includes the steps of providing a dewatering table for supporting the forming fabric thereon which includes at least one wet box beneath the forming fabric through which to accumulate a mixture of air and water during dewatering of the particles, an air/water separator connected to the at least one wet box to separate the air and water mixture accumulated therein, a centrifugal exhauster connected to the separator to supply vacuum to the dewatering table and the separator and to collect and dispose of the air segregated in the separator, drive means for the separator, means for collecting water accumulated in the separator, and control means for operating the exhauster, the separator and the remainder of the dewatering table.

18. The invention in accordance with claim 10 which includes the steps of providing a dewatering table supporting the forming fabric thereon and having an end at which the particles are discharged, and a filter press positioned adjacent the discharge end of the dewatering table and the particles leaving the table are discharged into the filter press for further dewatering.

* * * * *

UNITED STATES PATENT AND TRADEMARK OFFICE
CERTIFICATE OF CORRECTION

PATENT NO. : 4,419,249
DATED : December 6, 1983
INVENTOR(S) : Joseph A. Bolton/Louis L. Dufresne It is certified that error appears in the above—identified patent and that said Letters Patent is hereby corrected as shown below:

Column 3, Line 55: delete "includes"
insert therefor - inches -

Column 7, Line 26: after "comprising: providing"
insert - a primary -

Signed and Sealed this

Thirteenth Day of March 1984

[SEAL]

Attest:

GERALD J. MOSSINGHOFF

Attesting Officer

Commissioner of Patents and Trademarks